No. 696,106. Patented Mar. 25, 1902.
E. F. OSBORNE.
PIPE JOINT.
(Application filed July 26, 1900.)
(No Model.)
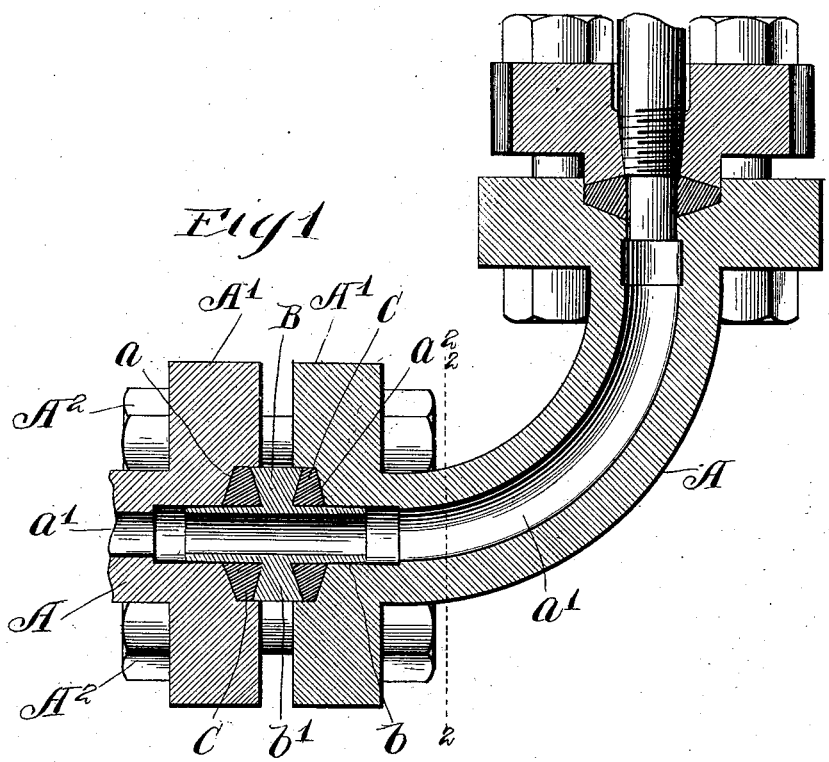
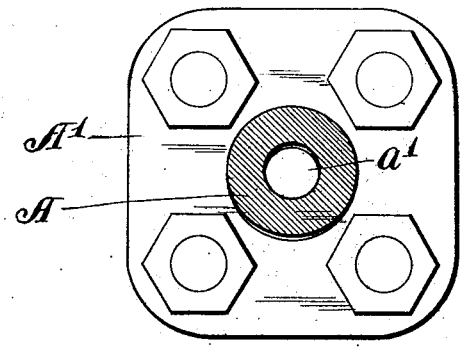
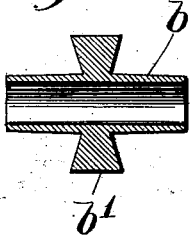
Witnesses:
Carl H. Crawford
William L. Hall
Inventor:
Eugene F. Osborne
by Pooh & Brown
his Attorneys

UNITED STATES PATENT OFFICE.

EUGENE F. OSBORNE, OF CHICAGO, ILLINOIS, ASSIGNOR TO THE OSBORNE STEAM ENGINEERING COMPANY, OF CHICAGO, ILLINOIS, A CORPORATION OF ILLINOIS.

PIPE-JOINT.

SPECIFICATION forming part of Letters Patent No. 696,106, dated March 25, 1902.

Application filed July 26, 1900. Serial No. 24,886. (No model.)

*To all whom it may concern:*

Be it known that I, EUGENE F. OSBORNE, of Chicago, in the county of Cook and State of Illinois, have invented certain new and useful Improvements in Pipe-Joints; and I do hereby declare that the following is a full, clear, and exact description thereof, reference being had to the accompanying drawings, and to the letters of reference marked thereon, which form a part of this specification.

This invention relates to piping-joints intended to be subjected to high pressures, and particularly designed for piping used for the conveyance of ammonia, carbon dioxid, and other fluid under high pressure.

The invention is herein shown as more particularly designed for the connection of one fitting with another.

In the accompanying drawings, illustrating my invention, Figure 1 is an axial section of a complete fitting and a fragment of another similar fitting, showing means for joining the same made in accordance with my invention. Fig. 2 is a cross-section on the line 2 2 of Fig. 1. Fig. 3 is an axial section of a fitting-nipple which enters into the joint in uniting two fittings. Fig. 4 is an axial section of a packing-ring which enters also into the joint.

As shown in Fig. 1 of the drawings, A designates a special fitting which may be a valve, a T, or other special casting or device. As shown, said fitting is an elbow. The complete fitting is herein shown, and means are illustrated at the upper end of the figure for joining a pipe-section to the fitting. It will be understood, however, that the present invention has to do only with the form of connection or joint shown at the lower left-hand side of said figure. Said fitting is shown as connected with a like fitting A, of which latter a fragment only is shown. Each of said fittings is provided with a flange $A'$, made integral with the body of the fitting, and in each end face of the flanges is formed a recess $a$, the bottom wall of which is concave and formed at an angle of approximately fifteen degrees to a diametric plane. Said recesses $a$ are concentric with the fluid-passages $a'$, extending through said fittings.

Extending between the proximate ends of the fitting A is a fitting-nipple B, consisting of a tube $b$ and an integral or loose annular flange $b'$, which corresponds in diameter with and fits within the recesses $a$ of the flanges $A'$. The passages $a'$ at the proximate ends of the fittings A A are somewhat enlarged and are made cylindric and receive the opposite ends of the fitting-nipple. In practice the opposite ends of the fitting-nipples $b\ b$ are slightly tapered toward the outer ends thereof and so proportioned that when slipped into the passages $a'$ they will have close peripheral engagement with the walls of such passage. The extent of the necessary taper is not sufficient to be appreciable on the drawings. The flange $b'$ of the connecting-nipple B is made of greater thickness at its periphery than at its part adjoining the nipple, and the inclination of the sides of said flange to a diametric plane is shown as approximately equal and in opposite directions to that of the inclination of the bottoms of the recesses $a$ in the flanges $A'$.

C C designate two packing-rings made of any suitable material, which are slipped over the ends of said nipple and interposed between said flange $b'$ thereof and the bottoms of the recesses $a$ in the flanges $A'$ of the fitting. The rings are made of the same diameter as the recesses $a$ and have convexed ends preferably disposed at an angle corresponding to the angle of the faces of the bottom wall of said recesses and the flange $b'$. The said flange $b'$ is made of such thickness at its periphery that it enters the recesses $a$ of the fitting-flanges. Provision is made in the length of the fitting-nipple with respect to the enlarged parts of the passage $a'$ to afford a space between the ends of the nipple and the smaller diameter of said passage to permit the flanges to be drawn toward each other by the clamping-bolts $A^2$ to any desired extent in order that the packing-rings may be properly compressed. For the purpose of thus drawing the flanges toward each other said flanges are apertured, as indicated in Fig. 2, to receive the clamping-bolts.

From the construction above described it is obvious that the packing-rings cannot flow under any clamping force that may be applied to the joint through the bolts $A^2$ and that said rings will therefore be acted upon by such clamping force only to compress them against their contacting walls and cause them to completely fill the spaces provided for them. Being in a special degree forced against the fitting-nipple by reason of the inclined surfaces of the rings and of the walls formed to press against them said rings make particularly close joints with the fitting-nipple, and therefore prevent the passage of fluid to the screw-threads which are beyond them and relieve the latter of all duty excepting that of holding the flanges in place. The tapering of the outer ends of the fitting-nipple also aids greatly in forming a tight joint in connection with the construction of packing-ring described, and in some instances the peripheral contact between the said nipple and the walls of the passage may be sufficient to prevent any or great leakage in case for any reason the packing-rings should fail.

The joint at the upper part of Fig. 1 is merely shown as illustrating a convenient means of attaching a pipe-section to the fitting; but it is to be understood that any other form of joint may be employed as found convenient or desirable. The form of joints shown at such location of Fig. 1 is, however, made the subject of specific claims in a current application filed by me of even date herewith.

I claim as my invention—

1. The combination with two relatively-movable pipe-fittings having at their adjacent ends orifices forming continuations of the passages, of a fitting-nipple comprising a tube which is contained at its opposite ends within said orifices of the fittings and has close peripheral contact with each of said fittings, a flange surrounding said tube between the said fittings, packing-rings surrounding said tube and interposed between said flange and the fittings and means for drawing said fittings together to compress the packing-rings by bringing pressure to bear upon all parts of the external surfaces of said rings.

2. The combination with two relatively-movable pipe-fittings having at their adjacent ends orifices forming continuations of the passages therethrough, of a fitting-nipple comprising a tube which is contained at its opposite ends within said orifices of the fittings, said ends of the tube being slightly exteriorly tapered and having close peripheral contact with the fittings, a flange surrounding said tube between said fittings, packing-rings surrounding said tube, and interposed between said flange and the fittings and means for drawing said fittings together to compress the packing-rings by bringing pressure to bear upon all parts of the external surfaces of said rings.

3. The combination with two relatively-movable fittings having at their adjacent ends orifices forming continuations of the passages therethrough and provided in their end faces with recesses surrounding said orifices, of a fitting-nipple comprising a tube which fits at its opposite ends within said orifices of the fittings and has close peripheral engagement with each of said fittings, a flange surrounding said tube between said fittings and designed to enter at its edges said recesses in the end faces of the fittings, packing-rings interposed between said flanges and the fittings and made of a diameter to fit within said recesses of the fittings, and means for drawing said fittings together to compress the packing-rings.

4. The combination with two relatively-movable fittings having at their adjacent ends orifices forming continuations of the passages therethrough and provided in their end faces with concave recesses surrounding said orifices, of a fitting-nipple comprising a tube which fits at its opposite ends within said orifices of the fittings, a flange surrounding said tube between said fittings and having concave side surfaces facing the concave bottoms of said recesses, the peripheral margins of said flanges entering said recesses, conical packing-rings interposed between said flanges and fittings and designed to fit within said recesses of the fittings, and means for drawing said fittings together to compress the packing-rings.

In testimony that I claim the foregoing as my invention I affix my signature, in presence of two witnesses, this 27th day of June, A. D. 1900.

EUGENE F. OSBORNE.

Witnesses:
TAYLOR E. BROWN,
WILLIAM L. HALL.